(12) United States Patent
Johnson et al.

(10) Patent No.: US 6,926,870 B2
(45) Date of Patent: Aug. 9, 2005

(54) COLLECTION SCOOP FOR FLUE GAS DESULFURIZATION SYSTEMS WITH BLEED STREAMS OR EX SITU FORCED OXIDATION

(75) Inventors: Dennis W. Johnson, Barberton, OH (US); David W. Murphy, Cuyahoga Falls, OH (US); Robert B. Myers, Copley, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 10/736,914

(22) Filed: Dec. 16, 2003

(65) Prior Publication Data

US 2004/0131526 A1 Jul. 8, 2004

Related U.S. Application Data

(62) Division of application No. 10/166,589, filed on Jun. 10, 2002, now Pat. No. 6,695,018.

(51) Int. Cl.⁷ .......................... B01D 50/00; B01D 53/14
(52) U.S. Cl. ......................... 422/168; 95/187; 95/195; 422/169
(58) Field of Search ................. 422/168, 169; 423/242, 243.01, 210, 243.03

(56) References Cited

U.S. PATENT DOCUMENTS

| | | | |
|---|---|---|---|
| 4,322,392 A | 3/1982 | Gleason et al. | |
| 4,687,649 A | 8/1987 | Kuroda et al. | |
| 4,976,936 A | 12/1990 | Rathi et al. | |
| 5,209,905 A | * 5/1993 | Onizuka et al. | 422/168 |
| 5,312,609 A | 5/1994 | College | |
| 5,451,250 A | 9/1995 | Gohara et al. | |
| 5,494,614 A | 2/1996 | Gohara et al. | |
| 5,512,072 A | 4/1996 | Laslo | |
| 5,645,807 A | 7/1997 | College et al. | |
| 5,779,999 A | 7/1998 | Laslo | |

OTHER PUBLICATIONS

*Steam*, Its Generation and Use, 40th Edition, The Babcock & Wilcox Company, ©1992, p. 35–1 to 35–11.
Brochure PCH–545 "MSCPA Uses ISFOR (sm) to Reduce Scaling and Reduce or Eliminate Landfill Costs," published Feb. 1997 by The Babcock & Wilcox Company.

* cited by examiner

*Primary Examiner*—Jerry D. Johnson
*Assistant Examiner*—Tom P. Duong
(74) *Attorney, Agent, or Firm*—Kathryn W. Grant; Michael J. Seymour; Eric Marich

(57) ABSTRACT

A scoop is used to collect a liquid slurry upstream of an internal collection tank. The scoop is in fluid communication with a downcomer, which receives at least part of the collected slurry, thereby maintaining a continuous flow of liquid slurry through the scoop to prevent plugging. Collected slurry can be removed for treatment from the scoop or the downcomer. In an application to a wet flue gas desulfurization (FGD) scrubber, the scoop collects an effluent slurry of partially reacted liquid scrubbing reagent and scrubbing byproducts before they drain into an internal reaction tank. Partially reacted liquid scrubbing reagent and scrubbing byproducts can therefore be withdrawn for treatment before the addition of fresh reagent alters the pH of the treatment stream.

3 Claims, 4 Drawing Sheets

COLLECTION SCOOP FOR FLUE GAS DESULFURIZATION SYSTEMS WITH BLEED STREAMS OR EX SITU FORCED OXIDATION

This application is a division of U.S. application Ser. No. 10/166,589 filed on Jun. 10, 2002, now U.S Pat. No. 6,695,018.

FIELD AND BACKGROUND OF INVENTION

The present invention relates generally to wet flue gas desulfurization (FGD) scrubbers and in particular to systems employing bleed streams or ex situ forced oxidation to oxidize sulfites to sulfates.

Typical wet FGD scrubbers, sometimes referred to as absorbers, consist of two major components: the scrubbing zone in which the actual gas scrubbing takes place and a reaction tank to allow efficient utilization of the reagent. The liquid reagent sprayed in the scrubbing zone captures sulfur dioxide ($SO_2$) forming sulfites and bisulfites. These systems run free of scale if the oxidation of sulfites to sulfates is kept below about 15% (inhibited oxidation) or above 98% (forced oxidation). One means of controlling scale formation in an FGD system is to force oxidization of the sulfites to sulfates by bubbling air through the recirculated reagent.

Many present-day wet FGD scrubbers are single loop forced oxidation systems in which the scrubbing zone and the reaction tank are combined into one structure within the wet scrubber in what is referred to as in situ forced oxidation. A known single loop, in situ forced oxidation wet FGD scrubber 100 is shown in FIG. 1. Flue gas enters the scrubber at an inlet 12 located above the internal reaction tank and passes through a scrubbing zone consisting of a series of spray header levels 14 having a plurality of nozzles 16 which spray liquid reagent recirculated from the internal reaction tank by pumps 18. In the internal reaction tank, air is introduced to promote oxidation of the sulfites to sulfates. Other reactions such as reagent dissolution also occur. Sulfur oxides, produced in significant quantity by the combustion of coal, fuel oil or other fossil fuels, are removed by the liquid spray from the flue gas before the flue gas is exhausted to a stack (not shown) through an outlet 2. The liquid reagent is usually an alkaline slurry of lime, limestone, alkaline fly ash with supplemental lime, magnesium-promoted lime or a solution of sodium carbonate. The liquid reagent sprayed in the scrubbing zone captures $SO_2$, forming sulfites and bisulfites. The pH of the partially reacted liquid reagent leaving the scrubbing zone falls to as low as about pH 4.5 depending on the reagent, stoichiometry, $SO_2$ concentration and other design parameters. The low pH scrubbing liquid then falls into the reaction tank. Fresh liquid reagent is added to bring the pH of the liquid reagent in the tank back up to a preset level, for example from 5.8 to 6.2.

To maintain the reaction tank free of scale, the sulfites are oxidized to sulfates. This oxidation is typically accomplished by forcing air to a header 22 from a pump (not shown) which is distributed to a series of perforated sparger pipes 24 located in the reaction tank to allow air to be bubbled therein to force oxidation of the sulfites to sulfates in the reaction tank.

Older systems were designed to oxidize sulfites by bubbling the air through the reagent in a separate, external reaction tank. The formed sulfates were separated and disposed of. These systems were referred to as ex situ forced oxidation systems. Other systems bled a slip stream of reagent from the internal reaction tank, bubbled air through the reagent to oxidize the sulfites, and then returned the reagent back to the reaction tank, in an arrangement intermediate between the ex situ and in situ oxidation systems.

In some ex situ oxidation systems, the partially reacted liquid reagent is captured in the internal reaction tank, where fresh alkaline reagent is added to replace the reacted reagent and readjust the pH. A first stream is removed from the internal reaction tank and recirculated to the scrubbing zone. A second stream is removed from the internal reaction tank and sent to a separate external reaction tank, sometimes referred to as an oxidizer or oxidation tank. The preferred pH of the reagent in the oxidation process in the external reaction tank is 5 or lower. The pH of the readjusted reagent removed from the internal reaction tank, however, is about 5.8 and may be higher, due to the addition of fresh alkaline reagent. Therefore sulfuric acid is added to the oxidation stream or the separate external reaction tank to neutralize the alkali, and adjust the pH to the range preferred for promoting the oxidation process.

In some other older systems, a semi-in situ forced oxidation process was used in which a scoop collected nearly all of the sprayed liquid reagent, and sent it to an external oxidation tank. The contents of the tank were then pumped directly back to the FGD tower, rather than to a de-watering system. Only a bleed stream containing fresh alkali was removed from the process stream for dewatering.

Yet another FGD system employed a bowl in a double-loop operation to collect all of the liquid reagent from the absorber stage of the FGD system, however no attempt was made to minimize the use of sulfuric acid.

In a double-loop system, there are two loops, which are virtually separate from each other. The scrubbing loop contains fresh alkaline liquid reagent. The liquid reagent is then sprayed over several layers of packing to enhance the $SO_2$ removal capability of the system. The contact between the reagent liquid on the packing and the flue gas causes the pH of the liquid reagent leaving the packing to drop, similar to the single-loop system. Then, the partially reacted liquid reagent, which is fairly low in pH, is collected in a bowl and sent to an external reaction or oxidation tank.

In a double-loop system, fresh liquid reagent is added to the external oxidation tank to maintain the process set point pH, and the adjusted pH liquid reagent is recirculated from the oxidation tank to the spray zone over the packing. Liquid reagent from the external oxidation tank overflows into the bottom of the scrubber, under the bowl, and is recirculated through a second loop to a set of headers, also located under the bowl. The function of these headers is to humidify the flue gas entering the scrubber so that wet/dry interface deposits do not form and assist in the scrubbing process. Partially reacted reagent liquid is usually drawn from the bottom of the scrubber based on a preset level. The lower loop usually runs at a lower pH than the upper loop to improve limestone utilization and reduce operating costs.

FIG. 2 illustrates a known double-loop flue gas desulfurization system comprising a housing, generally designated 5, having an inlet 12 near the bottom of the housing 5 for incoming flue gas. An outlet 2 is located at the top of housing 5 for the exit of flue gas after undergoing a scrubbing process within the housing 5.

Fresh liquid reagent is fed into feed tank 10 and pumped by pumps 30 to a plurality of upper level spray headers 20 located near the top of the housing 5 through a feed line 32 which is connected to the feed tank 10, the pumps 30 and the upper level spray headers 20. The liquid reagent sprayed by the upper level spray headers 20 has a high pH and is sprayed onto a packing 40, which is usually layered and has a depth of 2 to 3 feet, to enhance absorption of the $SO_2$ in the high pH liquid reagent and filter exiting flue gas before the flue gas is channeled through outlet 2.

The sprayed liquid reagent from the upper level spray headers 20 trickles over and through the packing 40, and is diverted by a shroud ring 50 which is disposed concentrically around an inner diameter of the housing 5 for channeling liquid reagent through its inner opening to a bowl 60 located directly beneath the shroud ring 50 which collects the liquid reagent. The shroud ring 50 and the bowl 60 prevent the upper loop liquid reagent from being channeled into the internal reaction tank 70 located at the bottom of the housing 5. The liquid reagent collected in bowl 60 is directed back into the feed tank 10 by a return line 62 which is connected to the bowl 60 and the feed tank 10.

As the level of liquid reagent rises in feed tank 10, excess or overflow liquid reagent overflows back into the housing 5 to the internal reaction tank 70 through an overflow line 80 which is connected to the feed tank 10 and the housing 5 at the internal reaction tank 70. Liquid reagent from the internal reaction tank 70 is pumped by quencher pumps 71 to an array of lower level spray headers 90 through a lower feed line 72 which is connected to the internal reaction tank 70. The pumps 71 and the lower level spray headers 90 are used for quenching and scrubbing the flue gas, and improving the overall reagent utilization within the scrubber housing 5. The level of liquid reagent in internal reaction tank 70 is maintained below the inlet 12 through the use of purge means, i.e. a purge stream, indicated at 7 which is well-known in the art.

SUMMARY OF INVENTION

The present invention is drawn to an improved collection device, or scoop, used to collect FGD liquid reagent upstream of an internal reaction tank and prior to the addition of fresh reagent. This significantly reduces the amount of acid required to maintain the proper pH in the external oxidation tank of a wet FGD system using bleed stream or ex situ oxidation. Unfortunately such collection devices are prone to plugging. The improved scoop of the present invention includes a downcomer, which is designed to maintain a continuous flow of liquid reagent through the downcomer, thereby preventing the scoop from plugging. The downcomer maintains a set liquid level in the scoop.

Accordingly, one object of the invention is drawn to a device to prevent plugging of a scoop or other apparatus used to collect and convey a liquid slurry away from a vessel.

Another object of the invention is drawn to a system for minimizing consumption of sulfuric acid in wet FGD systems using bleed streams or ex situ forced oxidation.

Another object of the invention is drawn to a method of removing sulfur oxides from flue gas that simultaneously minimizes sulfuric acid consumption and avoids plugging.

In one embodiment the invention comprises a device for diverting away at least a portion of reaction products and partially reacted liquid reagent flowing to an internal collection tank, the internal collection tank having a tank liquid level. The device includes a scoop extending at least partially across and above the tank liquid level and shaped to establish a scoop liquid level of reaction products and partially reacted liquid reagent within the scoop during operation. The scoop has a scoop outlet. The device also includes a downcomer having a downcomer inlet and a downcomer outlet for flow therethrough. The downcomer inlet is in fluid communication with and connected to the scoop outlet. The downcomer outlet is located during operation within the internal collection tank below the tank liquid level for continuously discharging reaction products and partially reacted liquid reagent from the scoop into the internal collection tank.

In another embodiment the invention comprises a system for removing sulfur oxides from flue gas. The system includes a wet flue gas desulfurization scrubber having a scrubbing zone, for converting sulfur oxides into a scrubbing product, and means for supplying a sulfur oxide absorbing liquid reagent to the scrubbing zone. The system has an internal reaction tank, located below the scrubbing zone, for collecting partially reacted liquid reagent and scrubbing products from the scrubbing zone. The internal reaction tank has a tank liquid level. The system includes a scoop having a scoop outlet. The scoop extends at least partially across and above the tank liquid level and is shaped to establish a scoop liquid level of partially reacted liquid reagent and scrubbing products within the scoop during operation. The system also includes a downcomer having a downcomer inlet and a downcomer outlet for flow therethrough. The downcomer inlet is in fluid communication with and connected to the scoop outlet. The downcomer outlet is located during operation within the internal reaction tank below the tank liquid level for continuously discharging partially reacted liquid reagent and scrubbing products from the scoop into the internal reaction tank.

In yet another embodiment, the invention comprises a method of removing sulfur oxides from flue gas which includes providing a wet flue gas desulfurization scrubber having a scrubbing zone located above an internal reaction tank, and then contacting the flue gas in the scrubbing zone with a liquid reagent to convert the sulfur oxides into a scrubbing byproduct and produce an effluent slurry of liquid and solids containing partially reacted liquid reagent and scrubbing byproducts. A first portion of the effluent slurry is collected in the internal reaction tank. Fresh liquid reagent is added to the effluent in the tank, and this first portion of the effluent slurry and fresh liquid reagent is recirculated from the tank back to the scrubbing zone. A second portion of the effluent slurry is collected between the tank and the scrubbing zone. A first part of this second portion of the effluent slurry is discharged for treatment in an external forced oxidation tank, and a second part of the second portion of the effluent slurry is discharged directly into the internal reaction tank.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
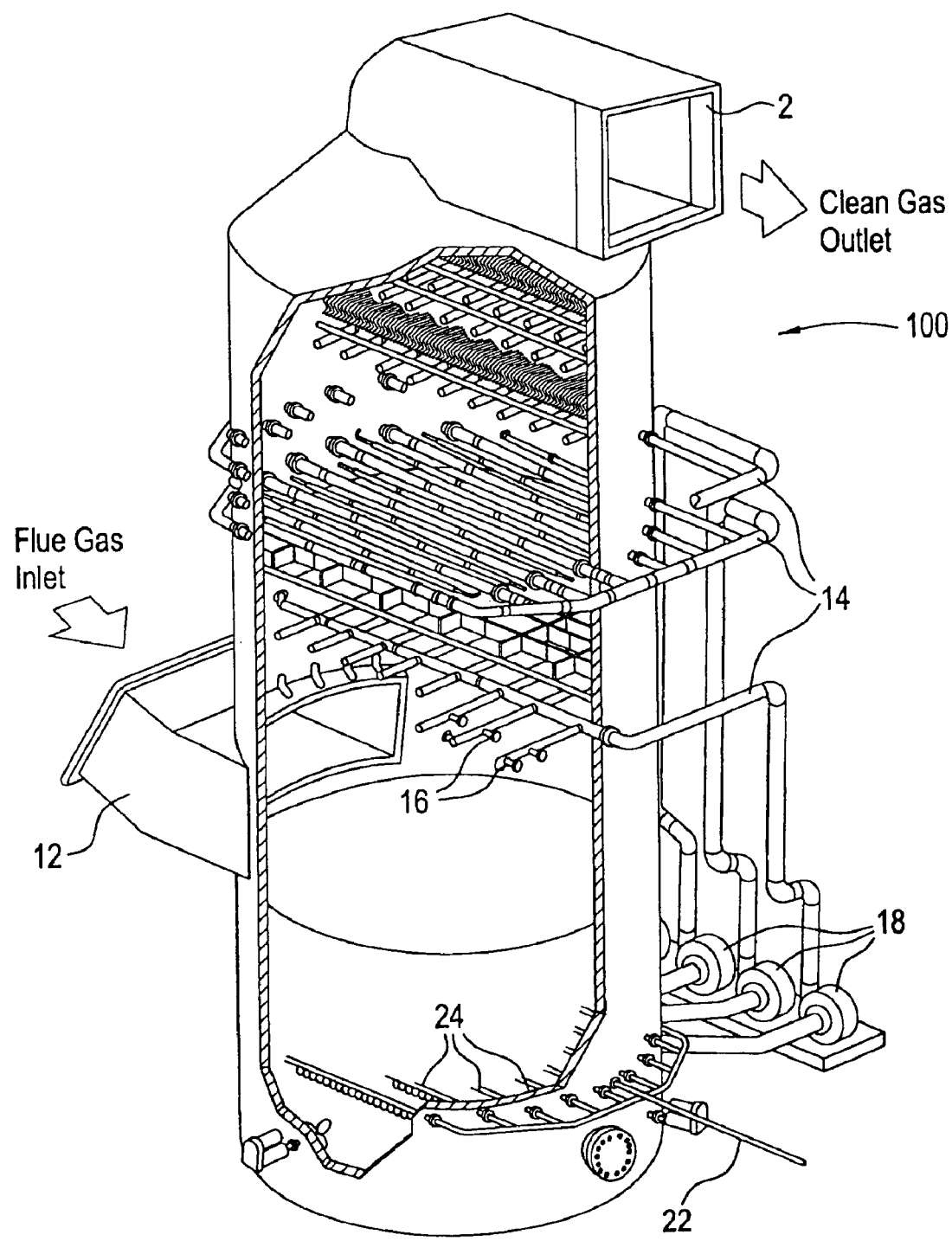
FIG. 1 is a perspective view of a known single loop wet FGD scrubber employing in situ forced oxidation.
Figure 2:
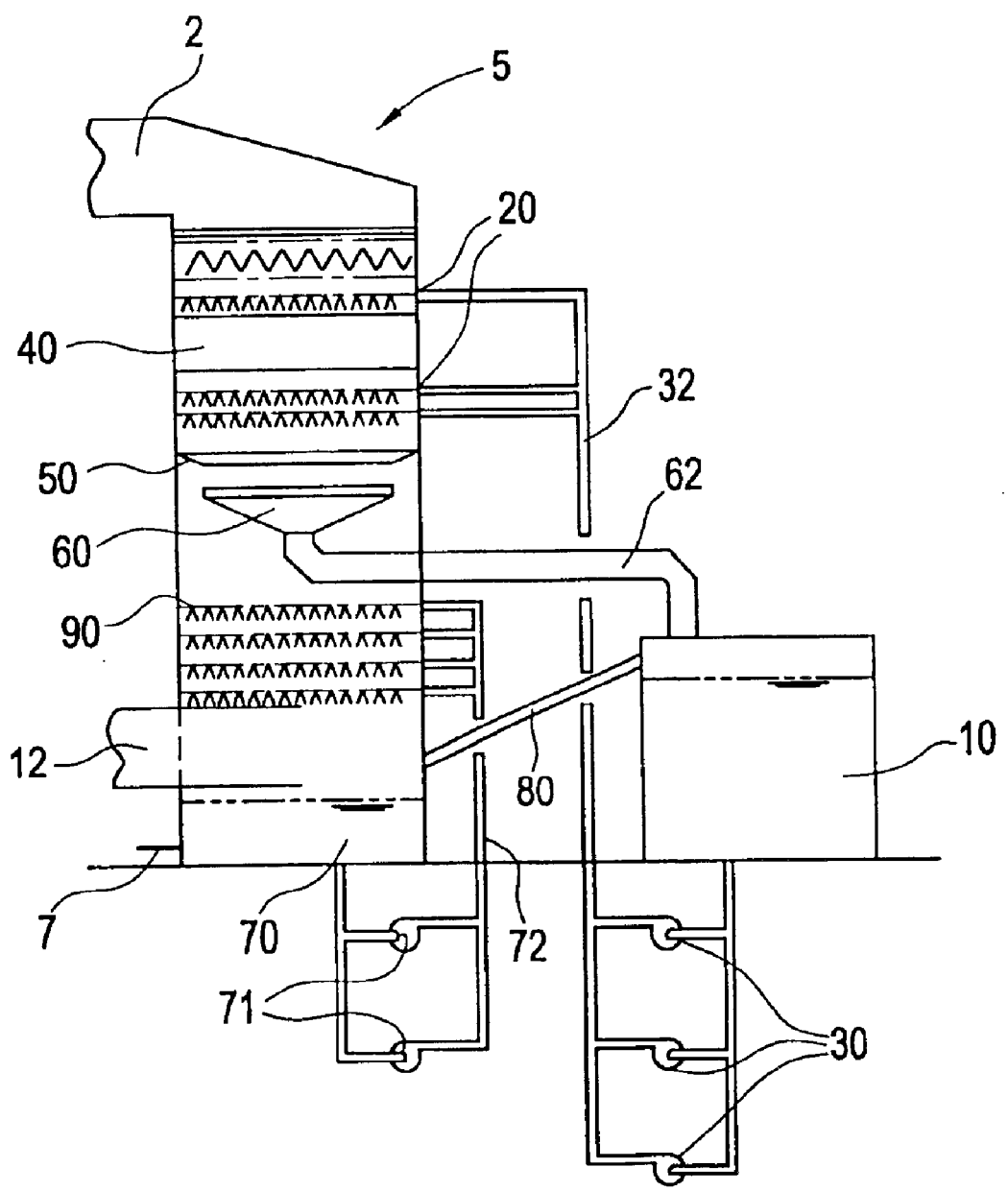
FIG. 2 is a schematic view of a known double-loop wet FGD scrubber employing ex situ forced oxidation.
Figure 3:
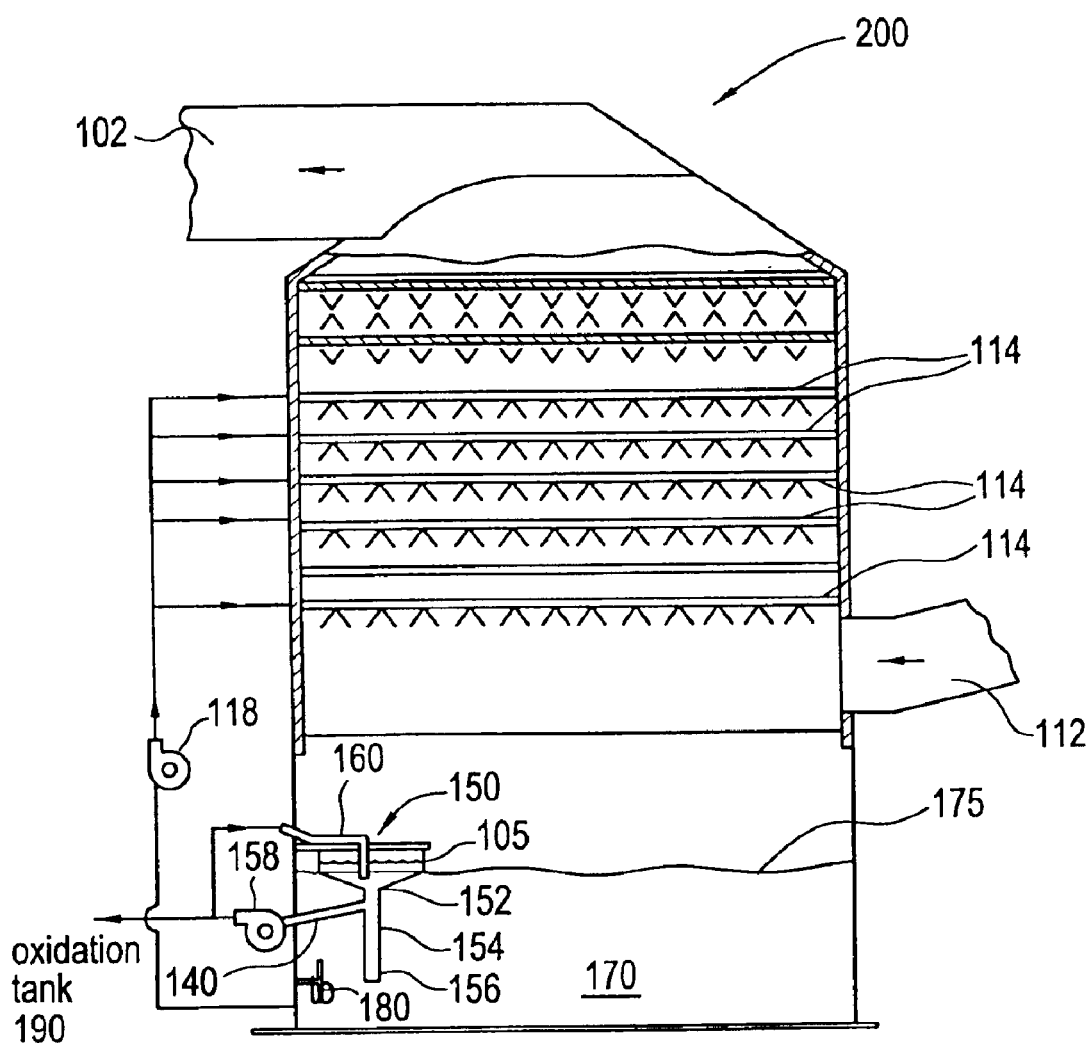
FIG. 3 is a partial schematic view of the subject invention in use in wet scrubber employing ex situ forced oxidation.

Referring now to the drawings, in which like reference numerals are used to refer to the same or similar elements, FIG. 3 shows a wet FGD scrubber 200. Flue gas enters at inlet 112 and passes through a scrubbing zone consisting of a series of spray header levels 114 having a plurality of nozzles 116 (not shown), located downstream of inlet 112 relative to the primary flue gas flow direction. Nozzles 116 spray liquid reagent, such as a magnesium promoted lime reagent, recirculated from the internal reaction tank 170 by pumps 118 (only one pump is shown for clarity). As the liquid reagent falls downward in wet FGD scrubber 200, it reacts with $SO_2$ contained in the flue gas, forming sulfite and bisulfite scrubbing byproducts. The $SO_2$ forms an acid in the presence of water, and reacts with the alkali in the sprayed liquid reagent, reducing the pH. Cleaned flue gas exits wet FGD scrubber 200 at scrubber outlet 102.

A collection device or scoop 150 is provided within wet FGD scrubber 200, to collect partially reacted liquid reagent and byproducts formed in the scrubbing zone. Scoop 150 discharges at least some of the collected partially reacted liquid reagent and scrubbing byproducts into downcomer 154. Downcomer 154 has a downcomer inlet end 152, located at the bottom of scoop 150, and a downcomer outlet end 156, located below the liquid level 175 within internal reaction tank 170.

Figure 4:
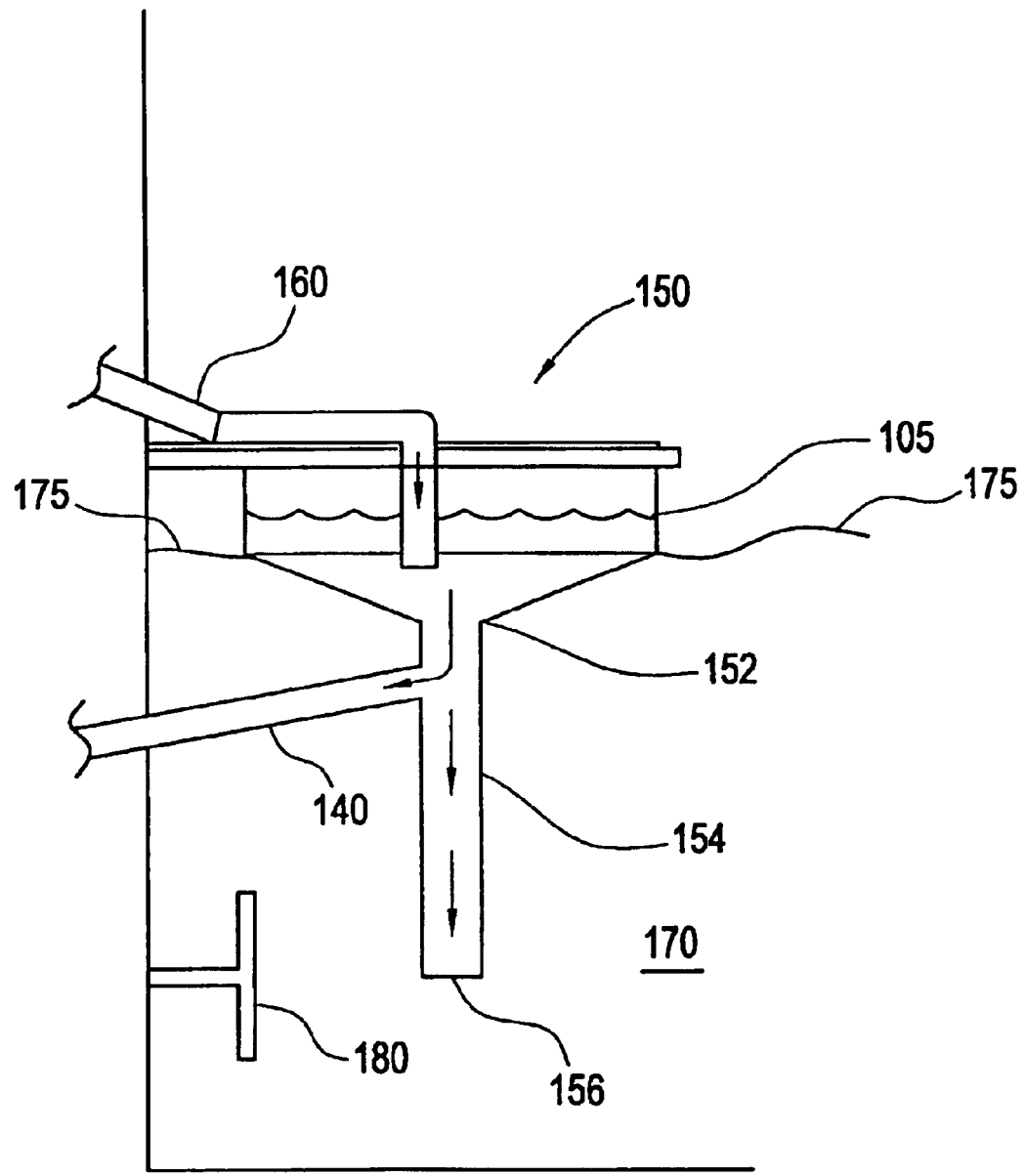
FIG. 4 is an enlarged view of the subject invention depicted in FIG. 3.

Placing downcomer outlet end 156 below the liquid level 175 in internal reaction tank 170 maintains a liquid level in scoop 150 and downcomer 154. As shown in FIGS. 3 and 4, the liquid level 105 in scoop 150 is maintained at a level greater than or almost equal to the liquid level 175 in internal reaction tank 170. Scoop 150 is designed and located in order to capture more liquid reagent than that required by the process requirements, thereby ensuring continuous flow of partially reacted liquid reagent and scrubbing byproducts through downcomer 154. Downcomer 154 is sized to provide the necessary liquid or liquid reagent level, while maintaining a flow rate of liquid reagent and scrubbing byproducts through the downcomer 154 sufficient to prevent plugging.

In a large wet FGD scrubber, approximately 40 feet in diameter and designed to treat the flue gas from the equivalent of a 250 MW coal-fired power plant, a scoop with a 1 foot diameter downcomer has been demonstrated to operate successfully without plugging. Without the downcomer, the same scoop plugged in a matter of weeks. In this particular system, the scoop captures approximately 10% of the liquid reagent discharged into the scrubbing zone, or about 50% more than required by process requirements.

In one embodiment, shown in FIGS. 3 and 4, downcomer outlet end 156 is located at the same level as mixer 180 to promote mixing of the fluid from the downcomer 154 with the liquid in the internal reaction tank 170.

Scoop 150 can be located anywhere in scrubber 200 below spray header levels 114 and above the liquid level 175 in the internal reaction tank 170, depending on the flue gas and liquid reagent requirements.

Partially reacted liquid reagent and scrubbing byproducts can be drawn off either from downcomer 154, e.g. via pump suction pipe 140 as shown in FIGS. 3 and 4, or directly from scoop 150, for processing in an external reaction tank, such as an oxidation tank 190 (not shown).

In one embodiment, a part of the withdrawn fluid is returned to scoop 150 via recycle pipe 160. The liquid level 175 of internal reaction tank 170 can be controlled by adjusting the split between the amount of fluid sent to oxidation tank 190 and the amount of fluid returned to scoop 150 via recycle pipe 160. If the liquid level 175 in internal reaction tank 170 is rising, more fluid is pumped to oxidation tank 190. If liquid level 175 is falling, more fluid is pumped back to scoop 150 via recycle pipe 160.

Downcomer 154 prevents scoop 150 from plugging. Since scoop 150 no longer becomes plugged shortly after startup, this allows scoop 150 to be used continuously thereby minimizing the need for the addition of sulfuric acid to the bleed stream or ex situ forced oxidation processes. The invention also permits the wet FGD scrubber 200 to operate at a higher pH, which increase $SO_2$ removal while minimizing reagent consumption.

The subject invention can be used with a wide variety of reagents common to FGD systems including, but not limited to, sodium, magnesium and calcium based compounds. The specific geometry of scoop 150 is not critical, and scoop 150 and downcomer 154 can be made of any suitable material, such as 317LMN stainless steel.

While the subject invention is particularly applicable to wet FGD systems using bleed stream or ex situ forced oxidation processes, the invention could also be applied to other conventional FGD systems, such as systems using in situ forced oxidation, to minimize reagent usage. The invention is generally applicable to collecting a portion of recirculated slurries from other chemical processes.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

We claim:

1. A system for removing sulfur oxides from flue gas, comprises:
    a wet flue gas desulfurization scrubber having a scrubbing zone for converting sulfur oxides into a scrubbing product;
    means for supplying a sulfur oxide absorbing liquid reagent to the scrubbing zone;
    an internal reaction tank, located below the scrubbing zone, for collecting partially reacted liquid regent and scrubbing products from the scrubbing zone, the internal reaction tank having a tank liquid level;
    a scoop having a scoop outlet, the scoop extending at least partially across and above the tank liquid level and shaped to establish a scoop liquid level of partially reacted liquid reagent and scrubbing products within the scoop during operation;
    a means for maintaining the scoop liquid level above the tank liquid level comprising a suction pipe connected to one of the scoop and the downcomer, a recycle pipe for discharging into the scoop, and a pump located therebetween;
    a downcomer having a downcomer inlet and a downcomer outlet for flow therethrough, the downcomer inlet in fluid communication with and connected to the scoop outlet, the downcomer outlet located during operation within the internal reaction tank below the tank liquid level for continuously discharging partially reacted liquid reagent and scrubbing products from the scoop into the internal reaction tank.

2. The device of claim 1, further comprising means, connected to one of the scoop and the downcomer, for conveying partially reacted liquid reagent and scrubbing products to an external tank.

3. The device of claim 2, wherein the scoop has sufficient area to collect partially reacted liquid reagent and scrubbing products in excess of that required to supply the external reaction tank.

* * * * *